United States Patent
Hickman et al.

(10) Patent No.: US 8,436,853 B1
(45) Date of Patent: May 7, 2013

(54) METHODS AND SYSTEMS FOR ACQUIRING AND RANKING IMAGE SETS

(75) Inventors: Ryan Hickman, Mountain View, CA (US); James R. Bruce, Sunnyvale, CA (US); Arshan Poursohi, Berkeley, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/594,913

(22) Filed: Aug. 27, 2012

Related U.S. Application Data

(60) Provisional application No. 61/673,767, filed on Jul. 20, 2012.

(51) Int. Cl.
*G06T 15/00* (2006.01)

(52) U.S. Cl.
USPC .......................................................... 345/419

(58) Field of Classification Search .................... 345/419
See application file for complete search history.

(56) References Cited

U.S. PATENT DOCUMENTS

| | | | |
|---|---|---|---|
| 6,455,835 B1* | 9/2002 | Bernardini et al. | 250/208.1 |
| 7,978,892 B2* | 7/2011 | Quadling et al. | 382/128 |
| 2001/0005204 A1* | 6/2001 | Matsumoto et al. | 345/418 |
| 2003/0091227 A1* | 5/2003 | Chang et al. | 382/154 |
| 2006/0072123 A1* | 4/2006 | Wilson et al. | 356/609 |
| 2009/0003686 A1* | 1/2009 | Gu | 382/154 |
| 2009/0157649 A1 | 6/2009 | Papadakis et al. | |
| 2009/0322745 A1* | 12/2009 | Zhang et al. | 345/420 |
| 2010/0023406 A1 | 1/2010 | Bhogal et al. | |
| 2010/0289878 A1* | 11/2010 | Sato et al. | 348/46 |

* cited by examiner

*Primary Examiner* — Jeffrey Chow
(74) *Attorney, Agent, or Firm* — McDonnell Boehnen Hulbert & Berghoff LLP

(57) ABSTRACT

Methods and systems for acquiring and ranking image sets are described. In an example, a computing device may be configured to determine a feature-based score that may be based on features of the object including geometry of the object. The computing device also may be configured to receive a plurality of sets of images of the object. A number of respective images of each set of images may be based on the feature-based score. The computing device further may be configured to determine for each set of images a respective image-based score based on a prospective three-dimensional (3D) visualization of the object to be generated by a merged output of that set of images. The computing device also may be configured to determine a respective ranking for each set of images based on the respective image-based score; and select a set of images based on the respective ranking.

19 Claims, 9 Drawing Sheets

METHODS AND SYSTEMS FOR ACQUIRING AND RANKING IMAGE SETS

CROSS REFERENCE TO RELATED APPLICATION

The present application claims priority to U.S. Provisional patent application Ser. No. 61/673,767, filed on Jul. 20, 2012, and entitled "Methods and Systems for Acquiring and Ranking Image Sets," which is herein incorporated by reference as if fully set forth in this description.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a 3D image. 3D object data models represent a 3D object using a collection of points in 3D space, connected by various geometric entities such as triangles, lines, curved surfaces, etc. Various techniques exist for generating 3D object data models utilizing point clouds and geometric shapes, for examples.

Being a collection of data, 3D models can be created by hand, algorithmically, or objects can be scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

3D object data models may include solid models that define a volume of the object, or may include shell or boundary models that represent a surface (e.g. the boundary) of the object. Because an appearance of an object depends largely on an exterior of the object, boundary representations are common in computer graphics.

3D models are used in a wide variety of fields, and may be displayed using a number of different types of interfaces. Example interfaces may provide functionality to enable interaction between a user and the 3D models.

BRIEF SUMMARY

The present application discloses systems and methods for acquiring and ranking image sets. In one aspect, a method is described. The method may comprise determining, by a computing device, a feature-based score. The feature-based score may be based on one or more features of an object including geometry of the object. The method also may comprise receiving, at the computing device, a plurality of sets of images of the object. A number of respective images of each set of images of the plurality of sets of images may be based at least on the feature-based score. The method further may comprise determining, by the computing device, for each set of images of the plurality of sets of images, a respective image-based score based on a prospective three-dimensional (3D) visualization of the object to be generated by a merged output of that set of images. The method also may comprise determining a respective ranking for each set of images of the plurality of sets of images based on the respective image-based score. The method further may comprise selecting a set of images of the plurality of sets of images based on the respective ranking.

In another aspect, a computer readable medium having stored thereon instructions executable by a computing device to cause the computing device to perform functions is described. The functions may comprise determining a feature-based score. The feature-based score may be based on one or more features of an object including geometry of the object. The functions also may comprise receiving a plurality of sets of images of the object. A number of respective images of each set of images of the plurality of sets of images may be based at least on the feature-based score. The functions further may comprise determining for each set of images of the plurality of sets of images, a respective image-based score based on a prospective three-dimensional (3D) visualization of the object to be generated by a merged output of that set of images. The functions also may comprise determining a respective ranking for each set of images of the plurality of sets of images based on the respective image-based score. The functions further may comprise selecting a set of images of the plurality of sets of images based on the respective ranking.

In still another aspect, a system is described. The system may comprise a computing device. The system may also comprise a memory, the memory configured to store instructions executable by the computing device to cause the computing device to determine a feature-based score. The feature-based score may be based on one or more features of the object including geometry of the object. The instructions also may be executable by the computing device to cause the computing device to receive a plurality of sets of images of the object. A number of respective images of each set of images of the plurality of sets of images may be based at least on the feature-based score. The instructions further may be executable by the computing device to cause the computing device to determine for each set of images of the plurality of sets of images, a respective image-based score based on a prospective three-dimensional (3D) visualization of the object to be generated by a merged output of that set of images. The instructions also may be executable by the computing device to cause the computing device to determine a respective ranking for each set of images of the plurality of sets of images based on the respective image-based score. The instructions further may be executable by the computing device to cause the computing device to select a set of images of the plurality of sets of images based on the respective ranking.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

In an example, a computing device may be configured to determine a feature-based score that may be based on features of an object including geometry of the object. The computing device also may be configured to receive a plurality of sets of images of the object. A number of respective images of each set of images may be based on the feature-based score. The computing device further may be configured to determine for each set of images a respective image-based score based on a prospective three-dimensional (3D) visualization of the object to be generated by a merged output of that set of images. The computing device also may be configured to determine a respective ranking for each set of images based on the respective image-based score; and select a set of images of the plurality of sets of images based on the respective ranking.

Figure 1:
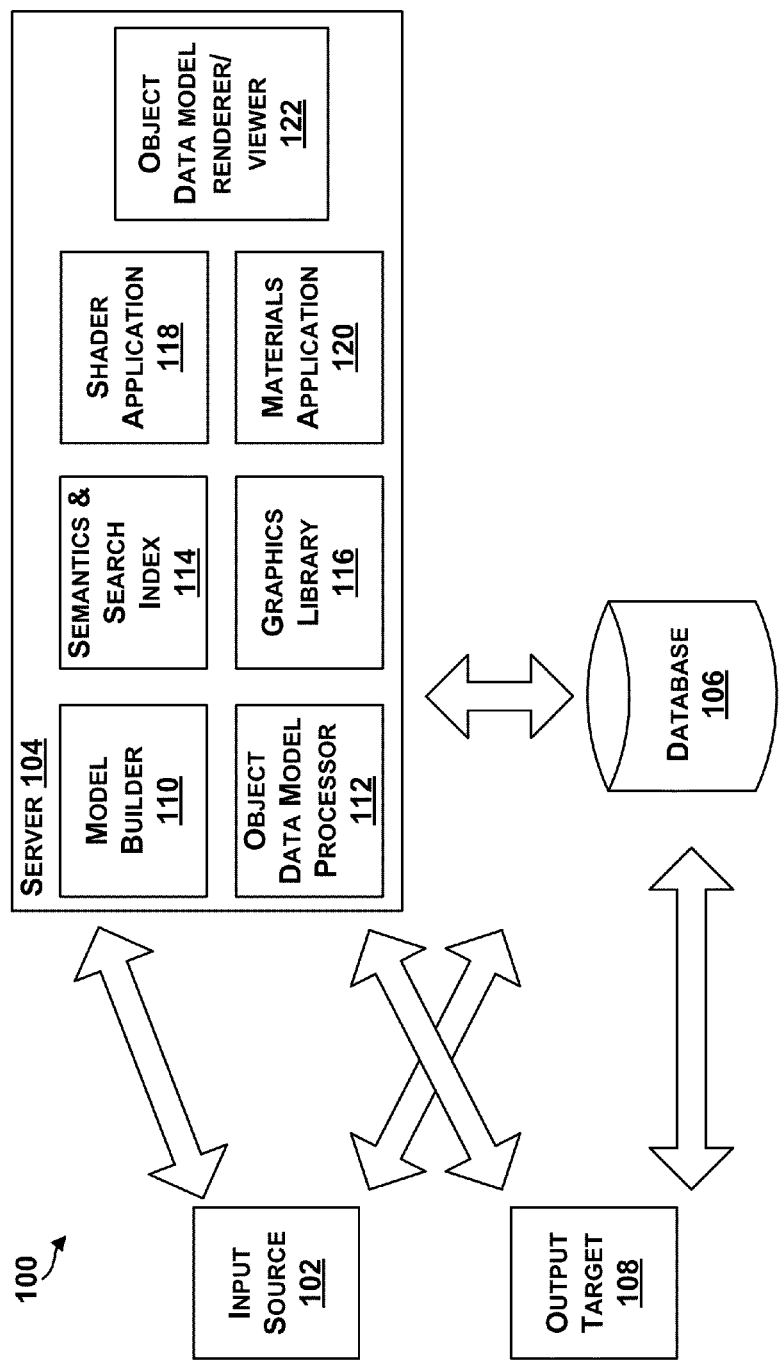
FIG. 1 illustrates an example system for object data modeling, in accordance with an embodiment.

Referring now to the figures, FIG. 1 illustrates an example system 100 for object data modeling, in accordance with an embodiment. The system 100 includes an input source 102 coupled to a server 104 and a database 106. The server 104 is also shown coupled to the database 106 and an output target 108. The system 100 may include more or fewer components, and each of the input source 102, the server 104, the database 106, and the output target 108 may comprise multiple elements as well, or each of the input source 102, the server 104, the database 106, and the output target 108 may be interconnected as well. Thus, one or more of the described functions of the system 100 may be divided up into additional functional or physical components, or combined into fewer functional or physical components. In some further examples, additional functional and/or physical components may be added to the examples illustrated by FIG. 1.

Components of the system 100 may be coupled to or configured to be capable of communicating via a network (not shown), such as a local area network (LAN), wide area network (WAN), wireless network (Wi-Fi), or Internet, for example. In addition, any of the components of the system 100 may be coupled to each other using wired or wireless communications. For example, communication links between the input source 102 and the server 104 may include wired connections, such as a serial or parallel bus, or wireless links, such as Bluetooth, IEEE 802.11 (IEEE 802.11 may refer to IEEE 802.11-2007, IEEE 802.11n-2009, or any other IEEE 802.11 revision), or other wireless based communication links.

The input source 102 may be any source from which a 3D object data model may be received. In some examples, 3D model acquisition (shape and appearance) may be achieved by working with venders or manufacturers to scan objects in 3D. For instance, structured light scanners may capture images of an object and a shape of the object may be recovered using monochrome stereo cameras and a pattern projector. In other examples, a high-resolution DSLR camera may be used to capture images for color texture information. In still other examples, a raw computer-aided drafting (CAD) set of drawings may be received for each object. Thus, the input source 102 may provide a 3D object data model, in various forms, to the server 104. As one example, multiple scans of an object may be processed into a merged mesh and assets data model, and provided to the server 104 in that form.

The server 104 includes a model builder 110, an object data model processor 112, a semantics and search index 114, and a graphics library 116, a shader application 118, a materials application 120, and an object data model renderer/viewer 122. Any of the components of the server 104 may be coupled to each other. In addition, any components of the server 104 may alternatively be a separate component coupled to the server 104. The server 104 may further include a processor and memory including instructions executable by the processor to perform functions of the components of the server 104, for example.

The model builder 110 receives the mesh data set for each object from the input source 102, which may include a data set defining a dense surface mesh geometry, and may generate an animated model of the object in 3D. For example, the model builder 110 may perform coherent texture unwrapping from the mesh surface, and determine textures of surfaces emulated from the geometry.

The object data model processor 112 may also receive the mesh data set for each object from the input source 102 and generate display meshes. For instance, the scanned mesh images may be decimated (e.g., from 5 million to 120,000 surfaces) utilizing texture-preserving decimation. Texture map generation can also be performed to determine color texture for map rendering. Texture map generation may include using the mesh data sets H that have colors but no UV (coordinate system of a 2D texture space) unwrapping to generate a mesh D with UV unwrapping but no colors. As an example, for a single output texture pixel of an image processing may include, for a given point in UV determine a triangle in the mesh's UV mapping D, and using triangle-local coordinates, move to an associated 3D point on the mesh. A bidirectional ray may be cast along the triangle's normal to intersect with the mesh H, and color, normal and displacement may be used for an output. To generate an entire texture image, each pixel in the image can be processed.

In some examples, the model builder 110 or the object data model processor 112 may output a 3D object data model of an object that includes one file with a combination of all data needed to render a 3D image of the object. In other examples, the model builder 110 or the object data model processor 112 may output a 3D object data model in the form of multiple files so that the 3D object data model file is divided into smaller parts.

The semantics and search index 114 may receive captured images or processed images that have been decimated and compressed, and may perform texture resampling and also shape-based indexing. For example, for each object, the semantics and search index 114 may index or label components of the images (e.g., per pixel) as having a certain texture, color, shape, geometry, attribute, etc. The semantics and search index 114 may receive the 3D object data model file or the files comprising the 3D object data model from the model builder 110 or the object data model processor 112, and may be configured to label portions of the file or each file individually with identifiers related to attributes of the file.

In some examples, the semantics and search index 114 may be configured to provide annotations for aspects of the 3D object data models. For instance, an annotation may be provided to label or index aspects of color, texture, shape, appearance, description, function, etc., of an aspect of a 3D object data model Annotations may be used to label any aspect of an image or 3D object data model, or to provide any type of information Annotations may be performed manually or automatically. In examples herein, an annotated template of an object in a given classification or category may be generated that includes annotations, and the template may be applied to all objects in the given classification or category to apply the annotations to all objects.

The graphics library 116 may include a WebGL or OpenGL mesh compression to reduce a mesh file size, for example. The graphics library 116 may provide the 3D object data model in a form for display on a browser, for example. In some examples, a 3D object data model viewer may be used to display images of the 3D objects data models. The 3D object data model viewer may be implemented using WebGL within a web browser, or OpenGL, for example.

The shader application 118 may be configured to apply a shader to portions of the 3D object data model file or to files of the 3D object data model according to the indexes of the file (as labeled by the semantics and search index 114) to generate a 3D image. The shader application 118 may be executed to apply a shader from a number of shaders according to the indexes of the file. The shader may include information related to texture, color, appearance, etc., of a portion of the 3D image.

In one example, the shader application 118 may be executed to render an image with shading attributes as defined by indexes of the files. For example, objects with multiple surfaces may have different attributes for each surface, and the shader application 118 may be executed to render each surface accordingly.

The materials application 120 may be configured to apply a material to portions of the 3D object data model file or to files of the 3D object data model according to the indexes of the file (as labeled by the semantics and search index 114) to generate a 3D image. The materials application 120 may be executed to apply a material from a number of materials according to the indexes of the file. The materials application may apply any material, such as leather, metal, wood, etc., so as to render an appearance of a portion of the 3D image.

In one example, the materials application 120 may access a database that includes information regarding a number of reference materials (e.g., brass, fur, leather), and objects with multiple materials may be separated into distinct portions so that the materials application 120 can be executed to render the separate distinct portions. As an example, a hood on a car may include a hood ornament, and the hood may be painted and the ornament may be chrome. The materials application 120 and the shader application 118 can be executed to identify two separate materials and render each material with an appropriate shade.

The object data model renderer/viewer 122 may receive the 3D object data model file or files and execute the shader application 118 and the materials application 120 to render a 3D image.

The database 106 may store all data sets for a 3D object data model in any number of various forms from raw data captured to processed data for display.

The output target 108 may include a number of different targets, such as a webpage on the Internet, a search engine, a database, etc. The output target 108 may include a 3D object data model viewer that enables product advertisements or product searches based on the 3D object data model.

In examples herein, the system 100 may be used to acquire data of an object, process the data to generate a 3D object data model, and render the 3D object data model for display.

Figure 2:
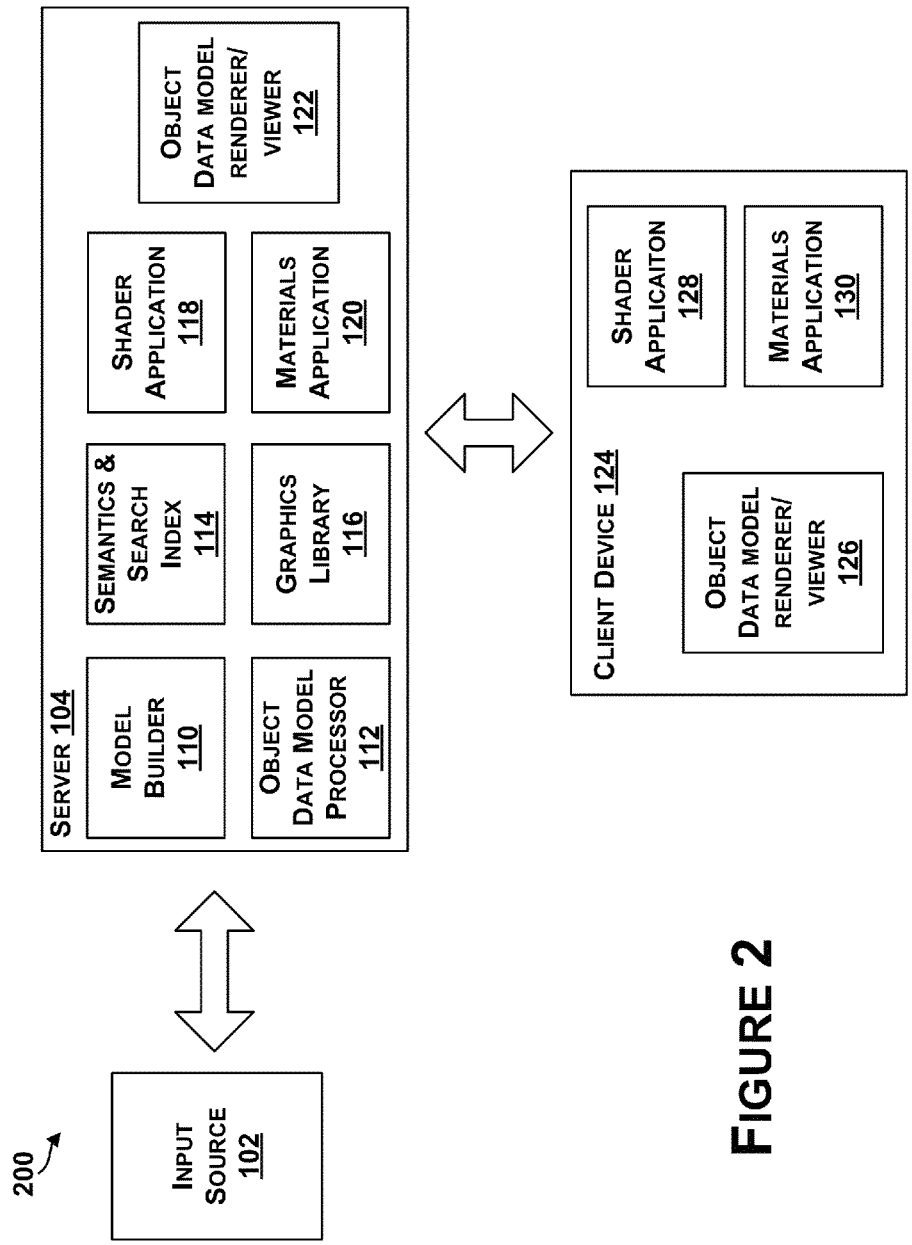
FIG. 2 illustrates another example system for object data modeling, in accordance with an embodiment.

FIG. 2 illustrates another example system 200 for object data modeling, in accordance with an embodiment. The system 200 includes the input source 102 coupled to the server 104, which is coupled to a client device 124. The input source 102 and the server 104 may be as described in FIG. 1. The client device 124 may receive outputs from any of the components of the server 124, and may be configured to render a 3D image.

The client device 124 includes an object data model renderer/viewer 126, a shader application 128, and a materials application 130. The object data model renderer/viewer 126, the shader application 128, and the materials application 130 may all be configured as described with respect to the object data model renderer/viewer 122, the materials application 120, and the shader application 118 of the server 104 as described with respect to FIG. 1.

In some examples, the client device 124 may receive the 3D object data model file or files from the server 104 and render a 3D image of the object by executing the shader application 128 and the materials application 130. When executing the shader application 128 and the materials application 130, the client device 124 may access separate databases to retrieve appropriate shader and material information to apply to the image, access the server 104 to receive appropriate shader and material information from the shader application 118 and the materials application 120, or may store information locally regarding the appropriate shader and material information to apply.

In some examples, the client device 124 may receive the 3D object data model file or files from the server 104 and render a 3D image of the object. In other examples, the server 104 may render a 3D image of the object and stream the 3D image to the client device 124 for display.

As described, in some examples, the 3D object data model may include various forms of data, such as raw image data captured, mesh data, processed data, etc. Data of the 3D object data model may be encoded and compressed so as to store information related to 3D geometry of an object associated with information related to appearance of the object for transmission and display within a web browser or application on a device.

In one example, data of the 3D object data model may be compressed by initially encoding a triangle mesh representing the 3D object as a list including a plurality of vertices and a plurality of indices. Each vertex in the list may have several arbitrary parameters associated with the vertex, including, but not limited to, position, surface normal, and texture coordinates. The triangle indices may be stored in a 16-bit unsigned integer format and vertex attributes may be stored in a 32-bit floating point format. The 32-bit floating point format vertex attributes may be reduced to 15-bits. In instances in which compressed data is for a version of a web browser or application that does not have the ability to decompress dictionary encoded data, a delta compression may be used to store differences between the triangle indices and vertex attributes, either in an array of structures layout or a transposed layout. After delta compression, post-delta data may be ZigZag encoded (e.g., using open-source Protocol Buffer library available from Google Inc.). Encoding may follow the format ZigZag(x): (x<<1)^(x>>15) with a corresponding decoding (during decompression) to follow the format UnZigZag(x): (x>>1)^(-(x & 1)). ZigZag encoding may be followed by multi-byte character encoding using UTF-8 encoding. Finally, the UTF-8 encoded data may be compressed using GNU Gzip or bzip2 to generate a compressed 3D object data model file.

The compressed copy of the 3D object data model file may be stored in a database, such as the database 106 in FIG. 1, in the server 104, or on the client device 124, for example. In some examples, the compressed 3D object data model file may be provided by the server 104 to the client device 124 in response to a request from the client device 124. If using a web browser to view the 3D object data model file, the client device 124 may decompress the compressed 3D object data model file according to Java instructions provided in the object browser web page. A local copy of the object browser web page and a local copy of the uncompressed, searchable data of the 3D object data model file can be stored in local memory of the client device 124. The client device 124 may display exemplary screenshots of an initial default view of a 3D object, based on the searchable data of the 3D object data model file loaded in the web browser.

In some examples, the 3D object data file includes information as to geometry of an object sorted by material and divided into portions to be loaded as fragments and reassembled in portions by the client device. As one example, for a mobile phone comprising multiple parts, each part may be rendered using a separate or distinct shader for each material. Thus, the 3D object data file may be divided into multiple portions and compressed as described above to retain all portions. The client device may receive the compressed 3D object data file, decompress the file, and reassemble the portions of the object one-by-one by loading each fragment of the file, streaming file requests for each shader, and reassembling an image of the object.

Figure 3:
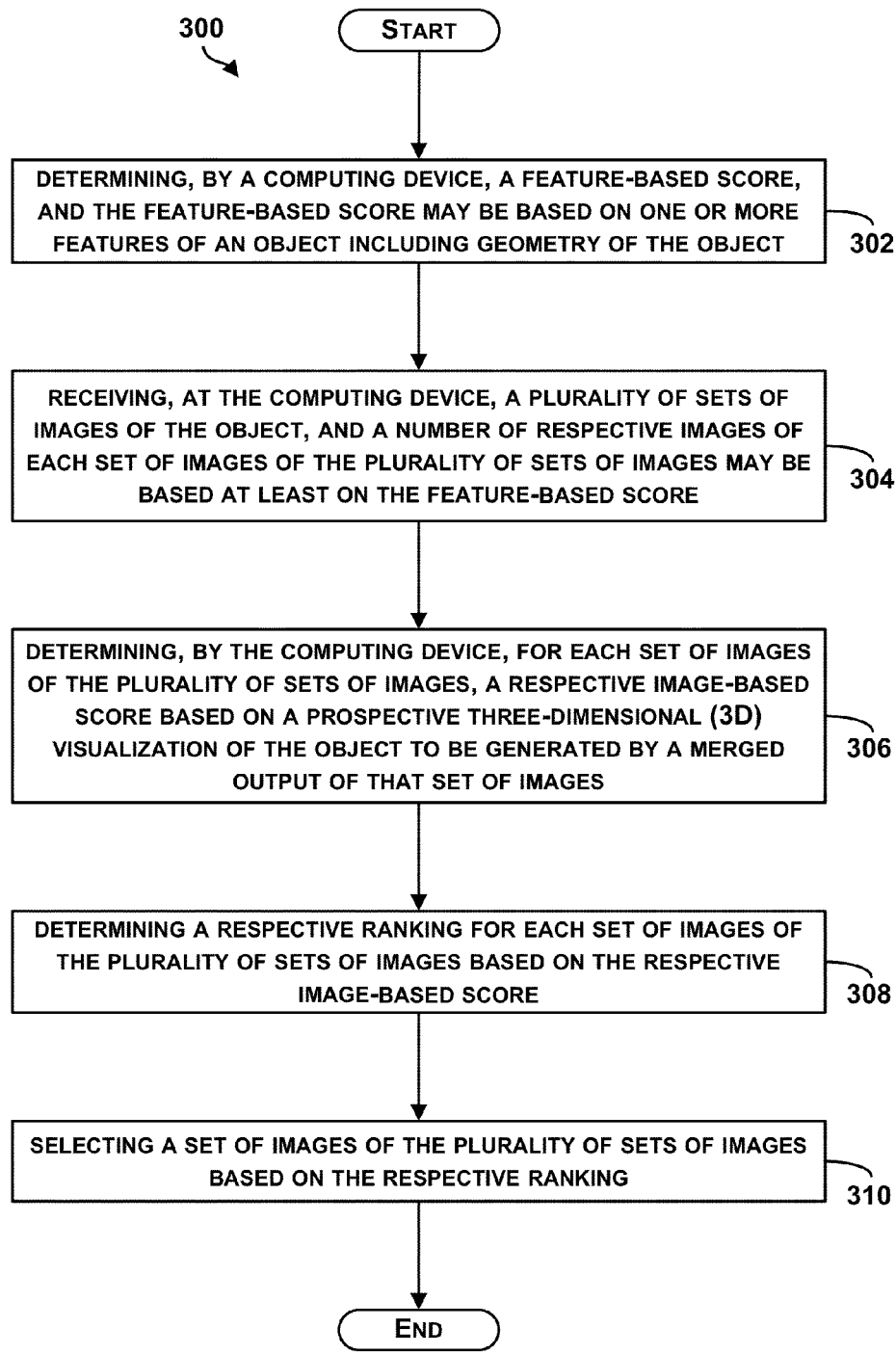
FIG. 3 illustrates a flowchart of an example method for acquiring and ranking image sets, in accordance with an embodiment.

As described above, the systems 100 or 200 may be used to acquire images of an object, process the data to generate a 3D object data model, and render the 3D object data model for display. FIG. 3 illustrates a flowchart of an example method 300 for acquiring and ranking image sets, in accordance with an embodiment. The method 300 shown in FIG. 3 presents an embodiment of a method that could be used by the systems 100 or 200 of FIGS. 1-2, for example.

The method 300 may include one or more operations, functions, or actions as illustrated by one or more of blocks 302-310. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation In addition, for the method 300 and other processes and methods disclosed herein, the flowchart shows functionality and operation of one possible implementation of present examples. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes determining, by a computing device, a feature-based score, and the feature-based score may be based on one or more features of an object including geometry of the object. In an example, the feature-based score may be indicative of complexity of the object. Complexity of the object may be based on features of the object including geometry, color, surface texture, deformability, shape, material, etc.

In an example, the feature-based score may be determined based on images of the object. For example, the computing device may be configured to extract or determine features of the object (e.g., through image recognition techniques known in the art) from the images and determine the feature-bases score accordingly.

In one example, complexity of the object may be based on geometric features of the object. The object may include simple symmetric geometric shapes, such as a solid parallelepiped, a solid sphere, a solid ellipsoid, a solid cylinder, a hollow cylinder, a solid circular cone, a solid pyramid, a solid frustrum, or a solid torus, for example. A complex object may include shapes that encompass elements of any of the aforementioned simple geometric shapes in any combination and may include elements with irregular surfaces, for example. Additionally, the complex object may encompass shapes having interior volumes having surfaces that are continuous with an outer surface of the object. Complex shapes may include shapes having flat, and/or curved, and/or irregular surfaces. For example, a given complex object may include shapes comprising more than a given number of flat surfaces, curved surfaces, and irregular surfaces or combinations of these surfaces. An irregular surface may exhibit a surface area greater than that of a smooth surface placed upon that irregular surface.

In another example, complexity of the object may be based on colors of the object. A simple object may have a single color or more than one color that are simple and distinguishable. A complex object may have multiple colors and mixtures of colors.

In still another example, complexity of the object may be based on deformability of the object. A simple object may be rigid and non-deformable. The non-deformable object may not change shape overtime or when subjected to a force, for example. A complex object may be deformable or include deformable parts that vary in shape over time, or when subjected to a force, or based on orientation of the object.

In yet another example, complexity of the object may be based on surface texture or surface finish of the object. Surface texture describes characteristic of a surface of the object. Surface texture may encompass three components: lay, surface roughness, and waviness. Lay is a measure of a direction of a predominant machining pattern used to manufacture the object. A lay pattern is a repetitive impression created on a surface of the object. Lay may be a representative of a specific manufacturing operation used to manufacture the object. Surface roughness is a measure of finely spaced surface irregularities. Waviness is the measure of surface irregularities with a spacing greater than that of surface roughness and occur due to warping, vibrations, or deflection during machining of the object, for example.

In addition, complexity of the object also may be based on other features such as a type of material of which the object is made.

The computing device may be configured to determine or assign a feature-based score indicative of complexity of the object based on the features of the object. The feature-based score may be numerical (e.g., 0.2 on a scale from 0 to 1) or may be qualitative (e.g., "high"). In an example, the computing device may be configured to determine a respective score for each of the features (e.g., geometry, surface textures, color, shape, material, etc.) of the object and further may be configured to determine a single feature-based score based on respective scores of the features (e.g., a weighted average of the respective scores).

In some examples, a subset of features of the features of the object may be used to determine the feature-based score, and one or more features may be disregarded in determining the feature-based score based on physical characteristics of the object. As an illustrative example, a surface of a given object may be made of leather while a respective surface of another object may be made of fur. In this example, details of surface geometry of the leather surface may be included in determination of the feature-based score since surface characteristics and geometry may be consistent over the object, however details of surface geometry of the fur surface may be disregarded since, for example, surface shape of fur may change over the object. Therefore, a type of the object may be determined or the object may be classified and the type or classification of the object may be indicative of nature of the features of the object. Based on the type or classification, a subset of the features of the object may be used to determine the feature-based score while other features may be disregarded.

At block 304, the method 300 includes receiving, at the computing device, a plurality of sets of images of the object, and a number of respective images of each set of images of the plurality of sets of images may be based at least on the feature-based score. The computing device may be configured to receive sets of images of the object captured by an image-capture device (e.g., a camera).

Figure 4A:
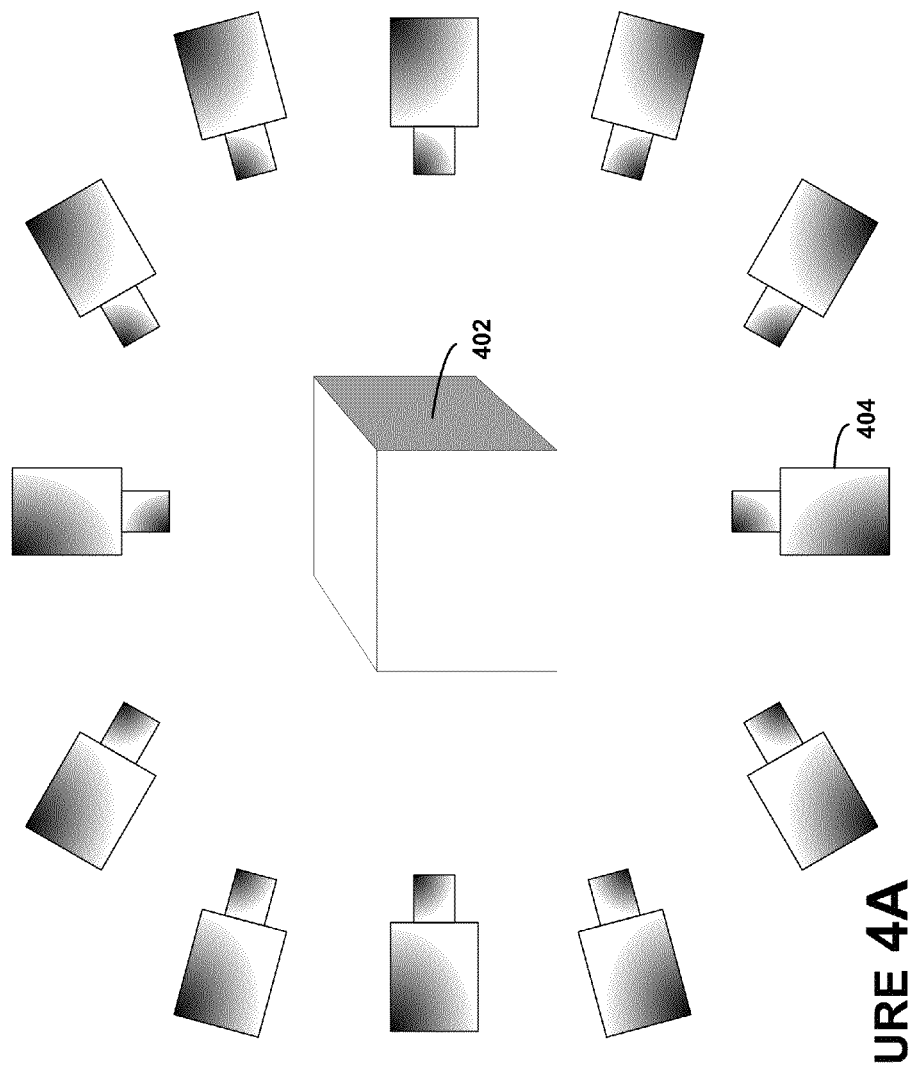
FIG. 4A illustrates an example object and an image-capture device configured to capture images of the object, in accordance with an embodiment.

FIG. 4A illustrates an example object 402 and an image-capture device 404 configured to capture images of the object 402, in accordance with an embodiment. The object 402 may be any three-dimensional (3D) object (e.g., a bag, a shoe, a phone, a statue, etc.). The image-capture device or camera 404 is shown in FIG. 4A at different angles with respect to the object 402 and may be configured to capture images of the object 402. For example, the camera may be rotated through a 360° rotation around the object to capture images of the object from different angles. The images also may be captured at different elevation as well as different angles. A number of images (e.g., number of angles and elevations from which images are captured) may vary based on complexity of the object 402, i.e., the feature-based score indicative of the complexity of the object 402, for example. Images from fewer angles may be captured for a simple symmetric object, for example, than for a more complex object that is not symmetric. Whether the object 402 is simple or complex may be indicated by the feature-based score.

In an example, the camera 404 may be fixed, while the object 402 may be rotated with respect to the camera 404 such that the camera 404 may capture images from different angles with respect to the object 402. In yet another example, the object 402 may be rotated at a given elevation for the camera 404 to capture a given set of images, then elevation may be changed and the object 402 is rotated again for the camera 404 to capture another set of images. This process may be repeated several times based on complexity and details of the object 402 (i.e., the feature-based score).

Referring back to FIG. 3, at block 306, the method 300 includes determining, by the computing device, for each set of images of the plurality of sets of images, a respective image-based score based on a prospective three-dimensional (3D) visualization of the object to be generated by a merged output of that set of images. The computing device may be configured to spatially align given images of a given set of images from the plurality of sets of images to merge the given images. In an example, the computing device may be configured to determine a respective image-based score for the given set of images based on whether a prospective 3D visualization of the object, to be generated based on the merged images, correctly represent details and structure of the object.

In some examples, to spatially align the given images, the computing device may be configured to match features depicted in a given image (e.g., portion of a hole in the object) of the given images to corresponding features (e.g., corresponding parts of the hole) in spatially neighboring images, based on respective capture angles/locations, to the given image.

In other examples, the given images of the given set of images may depict a pattern projected on the object. The pattern, for example, may be made of light emitted from a light source. The pattern may be simple (e.g., dots tracing a curve), or complex (e.g., a flower). To spatially align the given images of the given set of images to merge the given images, the computing device may be configured to match portions of the pattern projected on the object and depicted in each image of the given images to corresponding portions of the pattern in spatially neighboring images to that image.

The light source may be any type of an electromagnetic radiation source. The electromagnetic radiation source may be configured to project a light beam of any wavelength, visible or invisible. For example, the electromagnetic radiation source may be configured to project visible light such as laser beams with different colors and may additionally or alternately be configured to project invisible light such as infrared light.

Figure 4B:
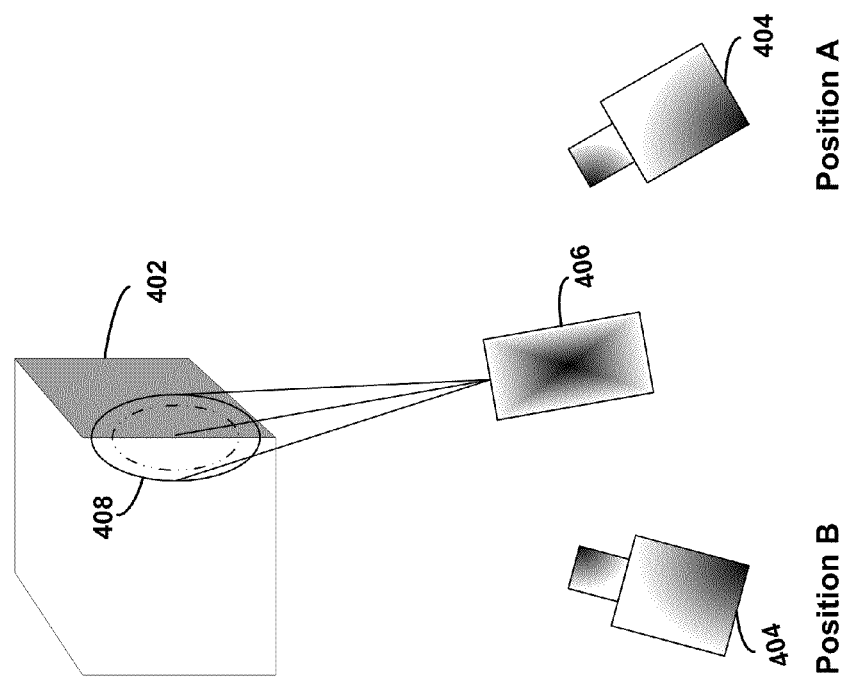
FIG. 4B illustrates an example light source projecting a pattern on the object, in accordance with an embodiment.

FIG. 4B illustrates a light source 406 projecting a pattern 408 on the object 402, in accordance with an embodiment. In FIG. 4B, the light source 406 is shown projecting the pattern 408 around an edge of the object 402, and the camera 404 is shown at two positions, position A and position B, for illustration only. In an example, the camera 404 may be at position A and may be configured to capture a respective image depicting the pattern 408 projected on the object 402. The camera 404 may be moved to position B to capture another image from another angle depicting the pattern 408 projected on the object 402.

In an example, the light source 406 may be rotated with the camera 404 capturing the given images. In another example, the light source 406 may be fixed while the camera 404 may be rotated from position A to position B. In other examples, the object 402 and the light source 406 may be rotated while the camera 404 may be fixed. Other arrangements are possible.

The pattern 408 is shown as two concentric circles for illustration only. Any other pattern is possible. Multiple patterns can be projected on the object. In an example, as the light source 406 (or the object 402) is rotated, patterns may be projected on substantially all portions of the object 402, while the camera 404 may be capturing the given images. The pattern 408 may include multiple colors, for example.

Figure 5A:
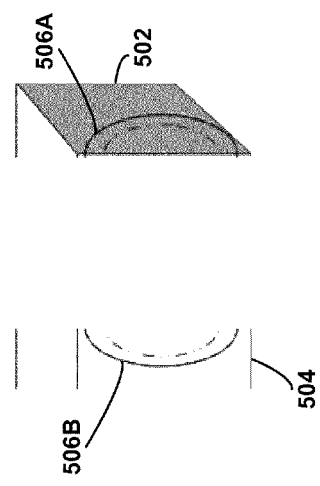
FIG. 5A illustrates an example of two images of two intersecting sides of the object depicting the pattern, in accordance with an embodiment.

FIG. 5A illustrates an example of two images 502 and 504 of two intersecting sides of the object 402 depicting the pattern 408, in accordance with an embodiment. As illustrated in FIG. 5A, the images 502 and 504 include portions 506A and 506B, respectively, of the pattern 408 shown in FIG. 4B, for example. As an example, the image 502 may be captured when the camera 404 is at position A, while the image 504 may be captured when the camera 404 is at position B. The images 502 and 504 may be identified by the computing device as spatially neighboring images.

Figure 5B:
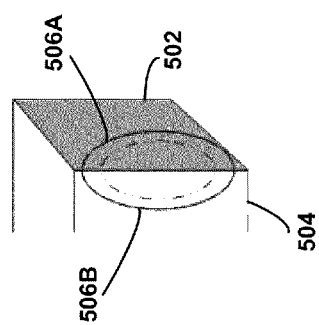
FIG. 5B illustrates a conceptual example of merging two images of two intersecting sides of the object based on the pattern projected on the object, in accordance with an embodiment.

FIG. 5B illustrates a conceptual example of spatial alignment of the two images 502 and 504 of the two intersecting sides of the object 402 based on the pattern 408 projected on the object 402, in accordance with an embodiment. As an example, the computing device may be configured to spatially align the images 502 and 504 by matching the portion 506A of the pattern 408 depicted in the image 502 to the portion 506B of the pattern 408 depicted in the image 504.

In the examples where the pattern 408 depicts more than one color, the computing device may be configured to match portions of the pattern 408 in a given image to corresponding portions in spatially neighboring images based, at least in part, on matching the more than one color of the pattern.

Spatial alignment illustrated in FIGS. 5A-5B may be performed for all or a subset of the given images of the given set of images captured. Although FIGS. 5A-5B illustrate aligning two images, in other examples more images can be aligned at a given time by the computing device to match corresponding portions of the pattern 408 projected on the object 402.

In some examples, the computing device may be configured to spatially align images using direct alignment methods to search for image alignments that minimize a sum of absolute difference between overlapping pixels including given portions of the pattern projected on the object.

In an example, spatially aligning images may include pre-processing the images. The images, for example, may be calibrated to minimize differences between ideal lens models and camera-lens combination, optical defects such as distortions, and differences in camera response. As another example, colors may be adjusted between images to compensate for exposure differences. In examples where camera motion while capturing the images of a set of images may be relevant, high dynamic range merging may be performed along with motion compensation. Those skilled in the art will appreciate that other algorithms and arrangements and other elements can be used for calibrating images.

The computing device may be configured to successfully match features of the object (or the pattern projected on the object) and merge given images of a given set of images to generate a 3D visualization; however, in some examples, the computing device may not successfully match features due to distortions in the given images. For example, the object may be a shoe with a blind hole where a foot is inserted into the shoe. Lighting around the shoe or in a background of the shoe may cause distortions in capturing images of the shoe that may not facilitate recognition of the hole by the computing device. Due to noise or distortions in the given images the computing device may not successfully render the 3D visualization of the shoe, for example. In examples, the computing device may be configured to make corrections to the given images to improve compatibility of the given images to be merged; and, in other examples, the computing device may be configured to determine that given images of the given set of images may not be successfully merged and the give set may be rejected.

In an example, the computing device may be configured to determine or assign, for each set of images, the respective image-based score to indicate a respective likelihood of success of merging the respective images to render the 3D visualization that correctly represent details and structure of the object. The respective image-based score may be based on details and content of respective images of that set of images.

In one example, the computing device may be configured to determine the respective image-based score by determining a surface normal (a vector pointing out of a surface and perpendicular to the surface) of a pixel in a given image in relation to a location of the image-capture device used to capture the given image, where the pixel is associated with a surface of the object depicted in the given image.

Figure 6:
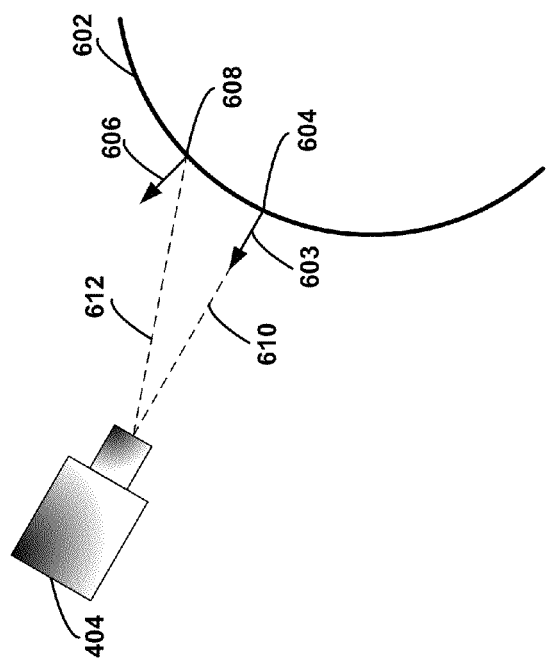
FIG. 6 illustrates conceptual example surface normals of points on a surface of an object in relation to an image-capture device, in accordance with an embodiment.

FIG. 6 illustrates conceptual example surface normals of points on a surface 602 of an object in relation to the image-capture device 404, in accordance with an embodiment. In the configuration shown in FIG. 6, a surface normal 603 corresponding to a point 604 (or a corresponding pixel in an image captured by the image-capture device 404) is parallel to a line 610 connecting the point 604 to the image-capture device 404. Also, a surface normal 606 corresponding to a point 608 is at an acute angle with respect to a line 612 connecting the point 608 to the image-capture device 404. Surface normals 603 and 606 are perpendicular to the surface 602.

The surface normal 603 of the point 604 is at about 0 degree with respect to the image-capture device 404 indicating, for example, that a given image captured by the image-capture device 404 of a portion of the object encompassing the point 604 may have minimum distortions. If the angle is greater than 0 degrees, such as the angle of the line 612 with respect to the surface normal 606, a corresponding image captured by the image-capture device 404 may include some distortions or less accurate depiction of features on the object. For example, the computing device may be configured to determine a color of a portion of the surface of the object more accurately when the angle is closer to 0 degrees than when the angle is closer to 90 degrees.

Thus, the computing device may be configured to determine surface normals of pixels in respective images of a respective set of images in relation to a location of the image-capture device used to capture the respective images and may accordingly determine the respective image-based score. The image-based score, for example, may be a function of an angle between a given surface normal and a given line connecting a respective pixel and the image-capture device. In an example, a given image-based score may be determined for each image of a given set of images and a respective image-based score may be determined for the given set of images based on individual image-based scores of respective images (e.g., a weighted average of the individual image-based scores).

In one example, a given image-based score may be highest when the surface normal is at about 0 degrees with respect to the image-capture device and lowest when the surface normal is at about 90 degrees with respect to the image-capture device.

In other examples, the image-based score may be based on content and features of the respective images other than the surface normals.

In an example, the higher the image-based score associated with respective images of a respective set of image, the higher the likelihood of success in generating the 3D visualization of the object using the respective images.

Referring back to FIG. 3, at block 308, the method 300 includes determining a respective ranking for each set of images of the plurality of sets of images based on the respective image-based score. Based on the respective image-based score, the computing device may be configured to determine or assign a respective ranking for each set of images.

At block 310, the method 300 includes selecting a set of images of the plurality of sets of images based on the respective ranking. As an example, a set of images assigned the highest ranking, based on the respective image-based score of the highest ranked set of images, may be selected. In an example, a respective 3D visualization of the object to be generated by merging respective images of the highest ranked set of images may represent the object most accurately. In one example, the computing device may be configured to generate a display of the 3D visualization of the object based on the selected set of images. In another example, the computing device may be configured to generate a 3D object data model of the object based on the selected set of images and render the 3D object data model to generate the 3D visualization of the object.

The computing device may be configured to generate the 3D object data model of the object by estimating 3D coordinates of points on the object. The coordinates may be determined by measurements made in the respective images. Common points may be identified on each image. A line of sight (or ray) can be constructed from a camera location to a point on the object. Intersection of these rays (triangulation) may determine a 3D location or coordinates of the point. Identified structures can be used to generate 3D models that can be viewed, for example, using 3D Computer Aided Design (CAD) tools. In one example, a 3D geometric model in the form of a triangular surface mesh may be generated. In another example, the model is in voxels and a marching cubes algorithm may be applied to convert the voxels into a mesh, which can undergo a smoothing operation to reduce jaggedness on surfaces of the 3D object data model caused by conversion by the marching cubes algorithm. An example smoothing operation may move individual triangle vertices to positions representing averages of connected neighborhood vertices to reduce angles between triangles in the mesh.

In one example, 3D object data model generation may further include application of a decimation operation to the smoothed mesh to eliminate data points, which may improve processing speed. After the smoothing and decimation operations have been performed, an error value may be calculated based on differences between a resulting mesh and an original mesh or original data, and the error may be compared to an acceptable threshold value. The smoothing and decimation operations may be applied to the mesh once again based on a comparison of the error to the acceptable value. Last set of mesh data that satisfies the threshold may be stored as the 3D object data model.

The triangles may form a connected graph. In this manner, two nodes in a graph may be connected if there is a sequence of edges that forms a path from one node to the other (ignoring direction of the edges). Connectivity may be an equivalence relation on a graph. For example, if triangle A is connected to triangle B and triangle B is connected to triangle C, then triangle A is connected to triangle C. A set of connected nodes may then be called a patch. A graph may fully be connected if it consists of a single patch. Algorithms may be implemented to use other information about the object that is known a priori (e.g., symmetries). Those skilled in the art will appreciate that other algorithms and arrangements and other elements can be used for generating a 3D object data model for the object.

Figure 7:
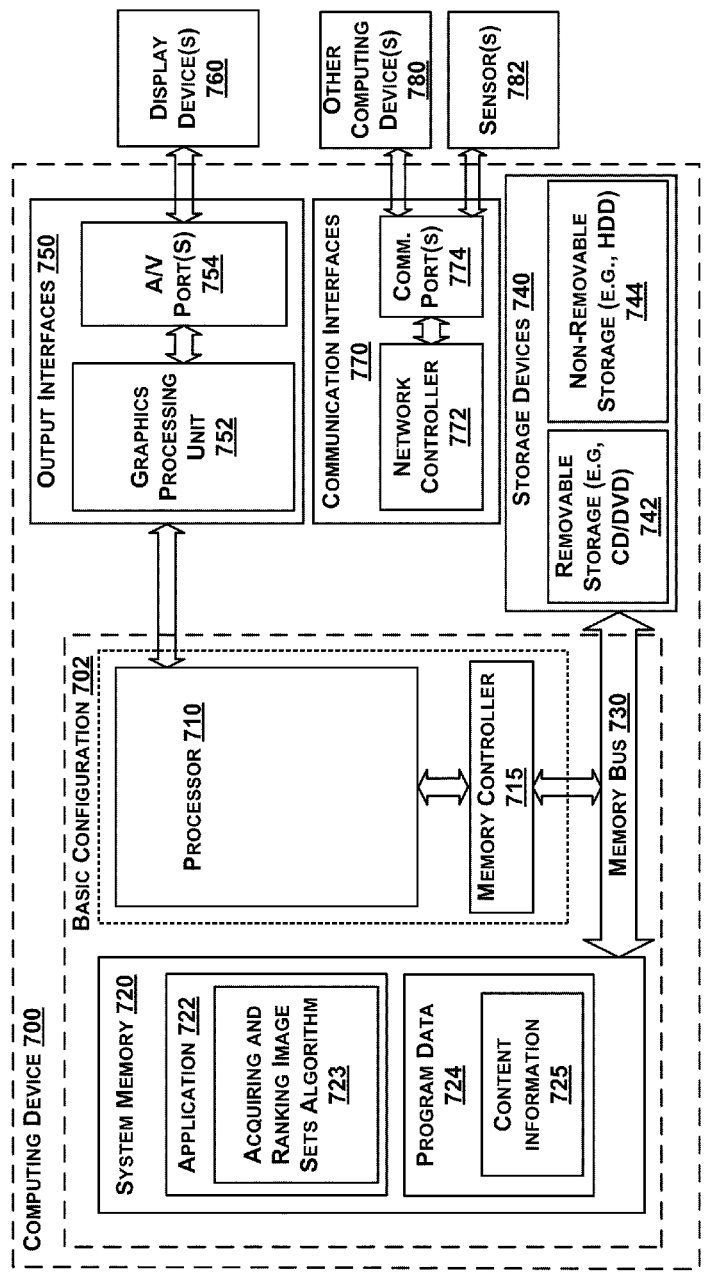
FIG. 7 is a functional block diagram illustrating an example computing device used in a computing system that is arranged in accordance with at least some embodiments described herein.

FIG. 7 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for acquiring and ranking image sets as described in FIGS. 1-6. In a basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include acquiring and ranking image sets algorithm 723 that is arranged to provide inputs to the electronic circuits, in accordance with the present disclosure. Program data 724 may include content information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of the computing device 700.

The computing device 700 can also include output interfaces 750 that may include a graphics processing unit 752, which can be configured to communicate to various external devices such as display devices 760 or speakers via one or more A/V ports 754 or a communication interface 770. The communication interface 770 may include a network controller 772, which can be arranged to facilitate communications with one or more other computing devices 780 and one or more sensors 782 over a network communication via one or more communication ports 774. The one or more sensors 782 are shown external to the computing device 700, but may also be internal to the device. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Figure 8:
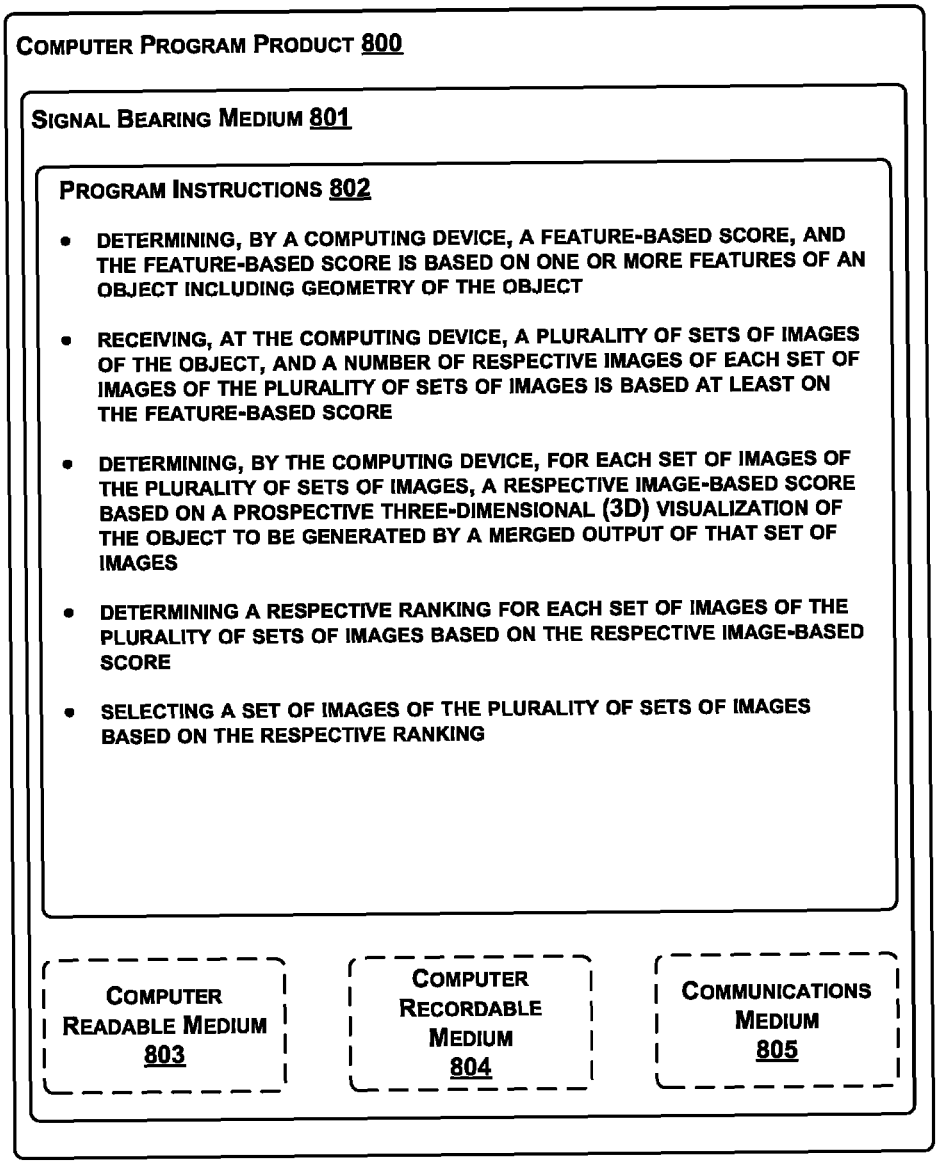
FIG. 8 is a schematic illustrating a conceptual partial view of an example computer program product that includes a computer program for executing a computer process on a computing device, arranged according to at least some embodiments presented herein.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming to the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
   determining, by a computing device, a feature-based score, wherein the feature-based score is based on one or more features of an object including geometry of the object;
   determining a number of respective images of each set of images of a plurality of sets of images to be captured for the object, and angles from which the respective images are to be captured, based at least on the feature-based score;
   receiving, at the computing device, the respective images of each set of images of the plurality of sets of images of the object;
   determining, by the computing device, for each set of images of the plurality of sets of images, a respective image-based score based on a prospective three-dimensional (3D) visualization of the object to be generated by a merged output of that set of images;
   determining a respective ranking for each set of images of the plurality of sets of images based on the respective image-based score; and
   selecting a set of images of the plurality of sets of images based on the respective ranking.

2. The method of claim 1, wherein the features of the object include color, shape, deformability, and surface texture of the object.

3. The method of claim 1, wherein determining the respective image-based score comprises:
   determining a surface normal of a pixel in a given image in relation to a location of an image-capture device used to capture the given image, wherein the pixel is associated with a surface of the object depicted in the given image; and
   determining the respective image-based score based on the surface normal.

4. The method of claim 3, wherein the respective image-based score is lowest when the surface normal of the pixel is at about 90 degrees in relation to the location of the image-capture device.

5. The method of claim 3, wherein the respective image-based score is highest when the surface normal of the pixel is at about 0 degrees in relation to the image-capture device.

6. The method of claim 1, wherein the merged output of that set of images is based on matching one or more colors of the object or of a pattern projected on the object in each image of that set of images to corresponding one or more colors of the object or of the pattern projected on the object in spatially neighboring images of that set of images.

7. The method of claim 1, wherein determining the feature-based score comprises disregarding a feature of the one or more features of the object, based on physical characteristics of the object.

8. The method of claim 1, wherein determining the feature-based score comprises:
   determining a type of the object, wherein the type of the object is indicative of physical characteristics of the object;
   determining a subset of features of the one or more features based on the type of the object; and
   determining the feature-based score based on the subset of features.

9. The method of claim 1, wherein the respective images depict a pattern projected on the object by a light source, wherein the merged output of the respective images is based on matching a portion of the pattern projected on the object in each image of the respective images to corresponding portions of the pattern depicted in spatially neighboring images of the respective images.

10. The method of claim 9, wherein the light source includes a laser source.

11. The method of claim 1, further comprising generating a display of a 3D visualization of the object based on the selected set of images.

12. A non-transitory computer readable medium having stored thereon instructions executable by a computing device to cause the computing device to perform functions comprising:
   determining a feature-based score, wherein the feature-based score is based on one or more features of an object including geometry of the object;
   determining a number of respective images of each set of images of a plurality of sets of images to be captured for the object, and angles from which the respective images are to be captured, based at least on the feature-based score;
   receiving the respective images of each set of images of the plurality of sets of images of the object;
   determining for each set of images of the plurality of sets of images, a respective image-based score based on a prospective three-dimensional (3D) visualization of the object to be generated by a merged output of that set of images;
   determining a respective ranking for each set of images of the plurality of sets of images based on the respective image-based score; and
   selecting a set of images of the plurality of sets of images based on the respective ranking.

13. The non-transitory computer readable medium of claim 12, wherein the features of the object include color, shape, deformability, and surface texture of the object.

14. The non-transitory computer readable medium of claim 12, wherein the respective images depict a pattern projected on the object by an electromagnetic radiation source as one or more of (i) a visible light, and (ii) and an invisible light, wherein the respective image-based score is indicative of the degree of accuracy with which given images of a respective set of images can be merged based on the pattern.

15. The non-transitory computer readable medium of claim 14, wherein the electromagnetic radiation source is configured to emit laser beams of different colors to project the pattern on the object.

16. The non-transitory computer readable medium of claim 12, wherein the instructions are further executable by the computing device to cause the computing device to perform functions comprising:
   classifying the object, wherein classification of the object is indicative of physical characteristics of the object;
   determining a subset of features of the one or more features based on the classification of the object; and
   determining the feature-based score based on the subset of features.

17. A system, comprising:
   a computing device; and
   a memory, the memory configured to store instructions executable by the computing device to cause the computing device to:
     determine a feature-based score, wherein the feature-based score is based on one or more features of the object including geometry of the object;
     determine a number of respective images of each set of images of a plurality of sets of images to be captured for the object, and angles from which the respective images are to be captured, based at least on the feature-based score;
     receive the respective images of each set of images of the plurality of sets of images of the object;
     determine for each set of images of the plurality of sets of images, a respective image-based score based on a prospective three-dimensional (3D) visualization of the object to be generated by a merged output of that set of images;
     determine a respective ranking for each set of images of the plurality of sets of images based on the respective image-based score; and
     select a set of images of the plurality of sets of images based on the respective ranking.

18. The system of claim 17, wherein the one or more features of the object include color, shape, deformability, and surface texture.

19. The system of claim 17, wherein the instructions are further executable to cause the computing device to:
   generate a 3D object data model of the object based on the selected set of images; and
   render the 3D object data model to generate a 3D visualization of the object.

* * * * *